United States Patent
Bliss et al.

(10) Patent No.: US 8,050,315 B2
(45) Date of Patent: Nov. 1, 2011

(54) OPEN COLLECTOR / OPEN DRAIN INTEGRATED BIDIRECTIONAL DIGITAL ISOLATOR

(75) Inventors: David Bliss, Loomis, CA (US); Sajol Ghoshal, El Dorado Hills, CA (US)

(73) Assignee: Akros Silicon Inc., Folsom, CA (US)

( * ) Notice: Subject to any disclaimer, the term of this patent is extended or adjusted under 35 U.S.C. 154(b) by 1104 days.

(21) Appl. No.: 11/881,200

(22) Filed: Jul. 26, 2007

(65) Prior Publication Data

US 2009/0028226 A1  Jan. 29, 2009

(51) Int. Cl.
*H04B 1/38* (2006.01)
*H04L 5/16* (2006.01)
(52) U.S. Cl. ...................................................... 375/220
(58) Field of Classification Search ................... 375/219, 375/220, 222, 244, 257, 258, 362, 377; 710/15, 710/29, 31, 105, 110, 305
See application file for complete search history.

(56) References Cited

U.S. PATENT DOCUMENTS

| | | | |
|---|---|---|---|
| 5,384,808 A * | 1/1995 | Van Brunt et al. ............. | 375/257 |
| 6,820,160 B1 * | 11/2004 | Allman ......................... | 710/305 |
| 7,738,568 B2 * | 6/2010 | Alfano et al. .................. | 375/258 |
| 2004/0081232 A1 * | 4/2004 | Scott et al. ..................... | 375/220 |
| 2006/0075170 A1 * | 4/2006 | Behrendt et al. .............. | 710/110 |
| 2006/0265540 A1 * | 11/2006 | Mass et al. ..................... | 710/305 |

* cited by examiner

*Primary Examiner* — David C. Payne
*Assistant Examiner* — Syed Haider
(74) *Attorney, Agent, or Firm* — DLA Piper LLP (US)

(57) ABSTRACT

An open collector/open drain interface, such as I²C interface between two or more integrated circuit devices, employs isolation techniques to provide electrical isolation of a digital signal for transmission of the signal between the devices. Uni-directional isolator channels are utilized to transmit bidirectional digital signals, and a selection of an isolator channel operating in an intended transmission direction is performed by direction control logic. Edge detection logic is utilized to determine changes in edges of a digital signal, thus determining a transmitting device and a transmission direction. The direction state is held in a direction state register. This state is held until the appropriate edge is detected on the transmit side, returning the isolator to the idle state. In the idle state neither side of the isolator is in a driven state. During transmission, the digital signal is transmitted through an isolator channel and sent to a receiving device.

16 Claims, 3 Drawing Sheets

OPEN COLLECTOR / OPEN DRAIN INTEGRATED BIDIRECTIONAL DIGITAL ISOLATOR

BACKGROUND

Isolation of digital signals communicated between devices is needed to reduce safety hazards as well as for noise robustness factors. Shock and fire hazards may result from digital signals that are not isolated. Additionally, excess noise may be introduced into the digital signals as a result of insufficient isolation. Thus, electrical isolation of digital signals being transmitted between devices, while still allowing the digital signal to be transmitted across an interface between the devices, is a necessary requirement.

Interface components, operating to communicate digital signals between devices, may be utilized to isolate the digital signals. Isolator channels are components for electrically isolating digital signals and may be employed in interface components for such a purpose. Isolator channels are uni-directional components, while digital signals may be bi-directional. Thus, one isolator channel may be utilized to transmit a digital signal in one direction, while a second isolator channel is needed to transmit the digital signal in an opposite direction. For example, the first isolator channel may be used for communication from a transmitter to a receiver, while the second isolator channel may be used for communication from the receiver to the transmitter.

When a digital signal reaches an interface between devices, it is necessary to determine the intended direction of the signal to allow for an isolator channel operating in the intended direction to be utilized to electrically isolate the digital signal. Thus, a need exists for a process and component to manage and control the direction of the signal across the interface.

SUMMARY

An open collector/open drain digital signal, such as, an I²C signal is communicated between two or more devices, such as microprocessors or peripheral devices, across an interface. The interface operates to receive, isolate, and transmit the digital signal. Isolator channels or isolation techniques are employed at the interface to electrically isolate the devices while still allowing the transmission of the digital signal. The isolator channels or isolation techniques are managed by direction control logic, that controls the direction of the signal across the interface. The direction control logic may employ edge detection techniques, operating to determine a transmitting device, isolate the signal in the direction towards the receiving device, and transmit the signal to the receiving device.

BRIEF DESCRIPTION OF THE DRAWINGS

The foregoing summary and the following detailed description are better understood when read in conjunction with the appended drawings. Exemplary embodiments are shown in the drawings; however, it is understood that the embodiments are not limited to the specific methods and instrumentalities depicted herein. In the drawings.

DETAILED DESCRIPTION

Figure 1:
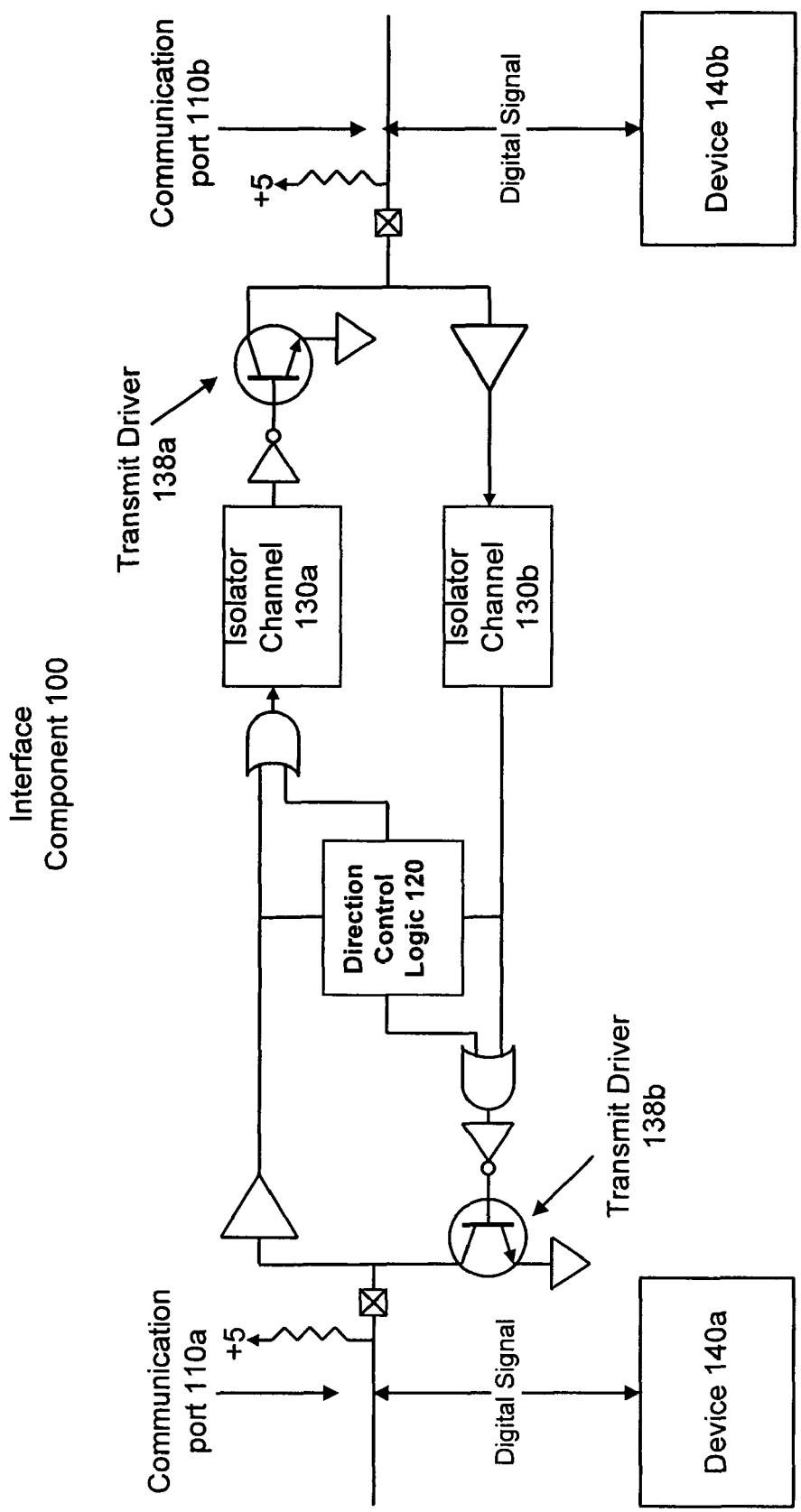
FIG. 1 is a diagram illustrating an exemplary open collector/open drain interface component for isolating bidirectional digital signals.

With reference to FIG. 1, a diagram illustrating an exemplary open collector/open drain interface component 100 for isolating bi-directional digital signals is shown. The interface component 100 may be used as an I²C interface, for example. The interface component 100 may also be utilized as an interface between a microprocessor and a peripheral chip, between two master peripheral chips, or between any components used for exchange of digital data.

The interface component 100 may operate to communicate and electrically isolate a digital signal between two devices, such as device 140a and device 140b. Bi-directional communication ports 110a and 110b may act as the link between the devices 140a and 140b and the interface component 100. The bi-directional communication ports 110a and 110b may operate to transmit and receive the digital signal between the two devices 140a and 140b. The digital signal may be a serial clock signal or a serial data signal, for example. Other types of digital signals may be communicated between the devices 140a and 140b across the interface component 100. Moreover, the interface component 100 may include additional bi-directional communication ports. Two ports, 110a and 110b, are shown only as an exemplary embodiment, as illustrated in FIG. 1.

Isolator channels 130a and 130b may be uni-directional isolator channels that operate to provide high-volt electrical isolation to digital signals. The means of isolation may be, but are not limited to, capacitive, magnetic, optical, or acoustical means.

Direction control logic 120 may be used to determine a direction of the digital signal. The digital signal may be a bi-directional digital signal. Upon determination of the direction of the digital signal, direction control logic 120 may provide the digital signal to one of two isolator channels 130a or 130b operating in the determined transmission direction. Transmit drivers 138a and 138b may then allow the transmission of the digital signal to the respective device 140b and 140a.

For example, the digital signal may be transmitted from a first device (140a) to be received by a second device (140b), or the second device (140b) may transmit the digital signal to be received by the first device (140a). The direction control logic 120 may determine the intended transmission direction of the digital signal by detecting an edge change in the digital signal. A default state of the edge of the digital signal may be high. The direction control logic 120 may monitor the digital signal and detect a change in the edge of the digital signal from high to low, thus detecting a desired transmission direction. Alternately, the default state of the edge of the digital signal may be a low state. In this case, the direction control logic 120 may, while monitoring the digital signal, detect a desired transmission direction when the edge of the digital signal changes from low to high.

Figure 2:
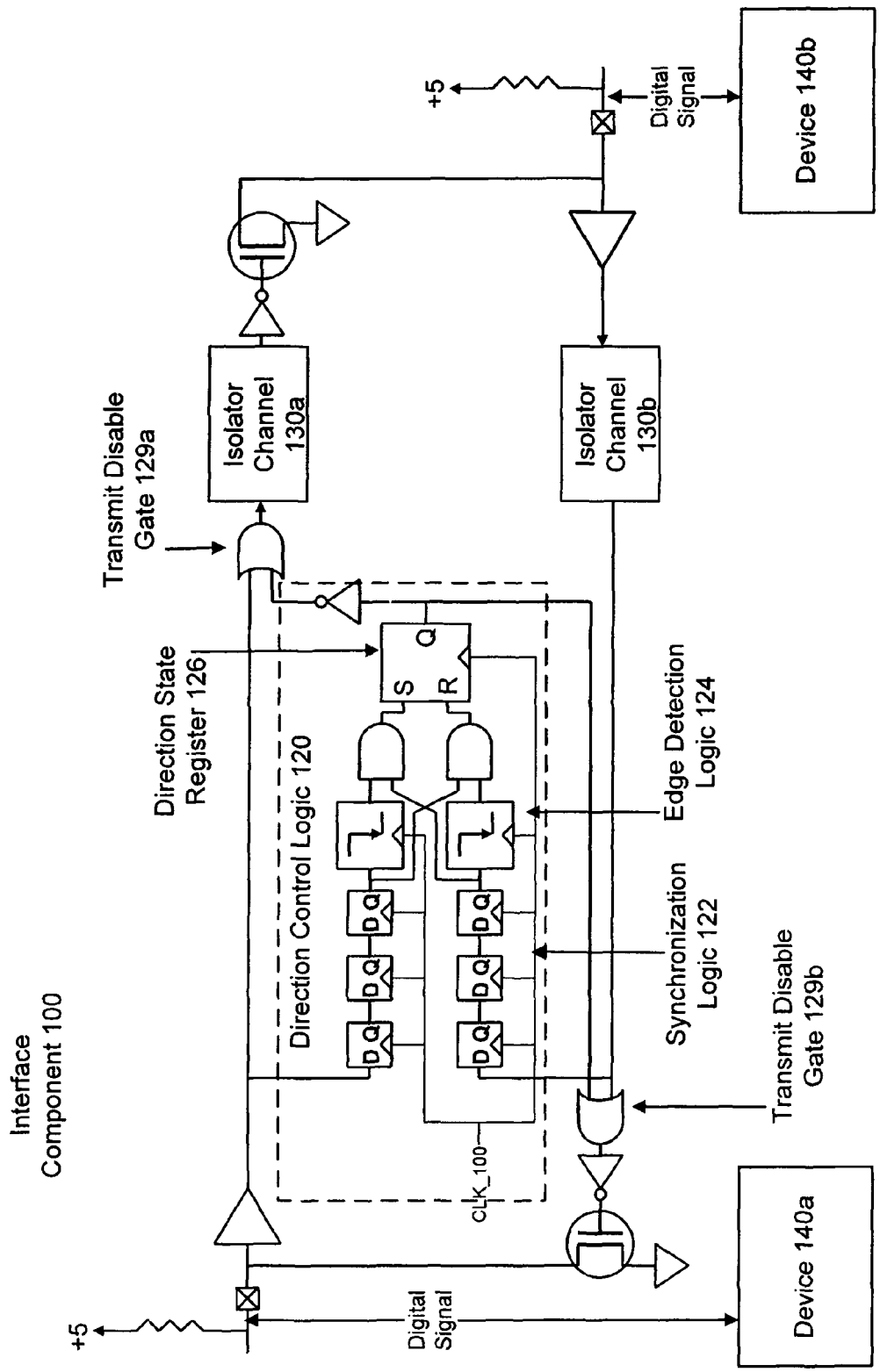
FIG. 2 is a diagram illustrating exemplary direction control logic.

The direction control logic 120 determines from which device, 140a or 140b, the desired transmission is initiated and allows the transmission of the digital signal through the isolator channel, 130a or 130b, operating in the intended transmission direction. Isolator channel 130a may operate to isolate and transmit digital signals from device 140a to device 140b; while isolator channel 130b may isolate and transmit digital signals from device 140b to device 140a. For example, direction control logic 120 may detect a change from high to low in a digital signal from device 140b. Upon this determination, direction control logic 120 transmits the digital signal through isolator channel 130b to be isolated and transmitted to device 140a. FIG. 2 is a diagram illustrating details of the exemplary direction control logic 120 of the interface component 100. Synchronization logic 122 may include synchronization flip-flops to synchronize the asynchronous digital signals coming into the isolator. Edge detection logic 124 may detect the edge change in the digital signal and may thus determine the intended transmission direction of the digital signal. The direction state register 126 may hold the direction state until the transmitting side returns to the high state. The transmit disable gates 129a and 129b prevent the receiving side from transmitting a low state back around to the transmitting side and causing the isolator to be stuck in a self reinforcing low-state on both sides.

Figure 3:
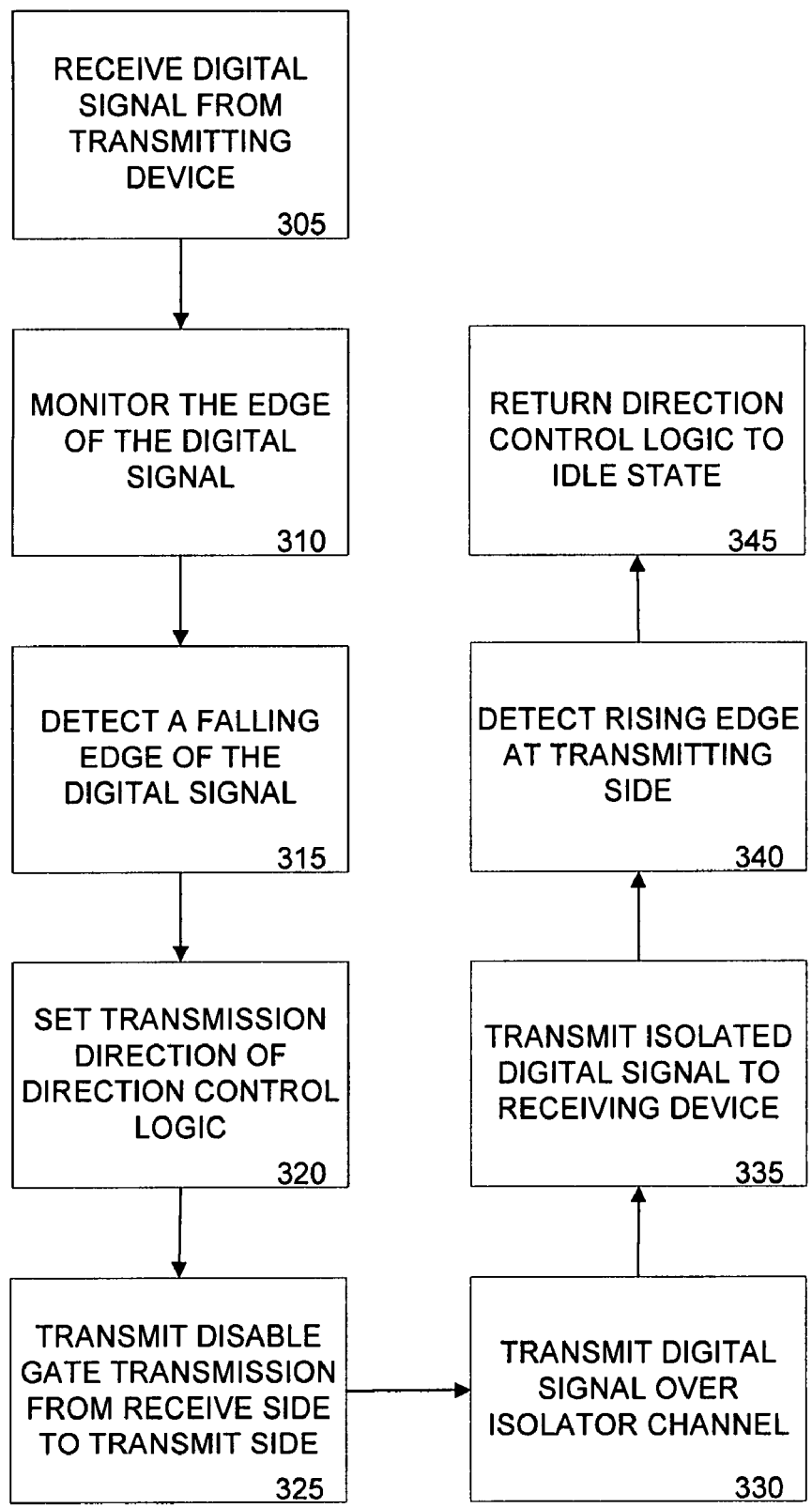
FIG. 3 is a flowchart illustrating an exemplary method of communicating a digital signal across an interface.

FIG. 3 is a flowchart illustrating an exemplary method of communicating a digital signal across the interface component 100 positioned between devices 140a and 140b. The interface component 100 may operate to electrically isolate a digital signal, which may be a bi-directional signal, between devices 140a and 140b.

At 305, the digital signal is received from one of device 140a or 140b, operating as the transmitting device. The digital signal may be received by an exemplary open collector/open drain interface component 100 from a bi-directional communication port 110a or 110b.

At 310, the edge of the digital signal is monitored. The edge may be monitored on a bit-by-bit basis. Other rates may be used for the monitoring operation. The edge may be monitored to detect a transmission of the digital signal. At 315, a fall in the edge of the digital signal from a high state to a low state is detected. The monitoring and edge-change detection may be performed by direction control logic 120, operating to determine an intended direction of the digital signal.

At 320, the direction in which to transmit the digital signal is set. The intended direction of the digital signal may be determined by detecting the device, 140a or 140b, transmitting a low state. The transmitting device may be determined by detecting from which device, 140a or 140b, the digital signal changes from a high to low state. The change in edge of the digital signal signifies an intended transmission of the digital signal.

At 325 the appropriate transmit disable gate, 129a or 129b, disables transmission of a logic low state from the receiving side to the transmitting side. This is done to prevent the open collector/open drain interface component 100 from getting into a dead lock state in which a self reinforcing low state is held at both sides of the interface component 100.

At 330, the digital signal is transmitted over an isolator channel. The transmission of the digital signal over an isolator channel provides high voltage electrical isolation between the transmitting device (140a or 140b) and the receiving device (140a or 140b). The transmission of the digital signal over an isolator channel may include utilizing a uni-directional channel to isolate the digital signal between the two devices, 140a and 140b. The uni-directional channel may be an isolator channel 130a or 130b.

At 335, the digital signal is transmitted to the receiving device. The digital signal may be transmitted to the correct device 140a or 140b over a bi-directional communication port 110a or 110b, depending on which device, 140a or 140b, receives the digital signal.

At 340, a rising edge of the digital signal is detected at the transmitting side, indicating that transmission of the digital signal is complete. At 345, after transmission of a low state, the direction control logic 120 may be reset to the idle state upon the return to the high state at the transmitting side. In the idle state, neither side of the isolator is in a driven state.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method of communicating a digital signal across an interface, wherein the interface is positioned between two devices, a transmitting device and a receiving device, and wherein the interface operates to receive, isolate, and transmit bidirectional digital signals between each of the two devices, the method comprising:
   receiving the digital signal at the interface from the transmitting device;
   analyzing the digital signal at the interface to detect a change in an edge of the digital signal from a high state to a low state by monitoring the edge of the digital signal;
   upon detecting a change in the edge of the digital signal from a high state to a low state, determining, at the interface, an intended direction of the digital signal;
   transmitting the digital signal from the interface to an isolator channel configured to isolate the digital signal in the intended direction of the digital signal;
   isolating the digital signal at the isolator channel; and
   transmitting the isolated digital signal in the intended direction of the digital signal from the isolator channel to the receiving device.

2. The method of claim 1, wherein analyzing the digital signal by monitoring the edge of the digital signal comprises monitoring the edge of the digital signal on a bit-by-bit basis.

3. The method of claim 1, wherein isolating the digital signal at the isolator channel provides high voltage electrical isolation between the transmitting device and the receiving device.

4. The method of claim 1, wherein isolating the digital signal at the isolator channel comprises utilizing a unidirectional isolation channel operating to electrically isolate digital signals between the transmitting device and the receiving device.

5. The method of claim 1, further comprising:
   upon transmission of the digital signal to the receiving device, regulating the isolator channel to prevent transmission of a second digital signal from the transmitting device to the receiving device.

6. The method of claim 1, wherein receiving the digital signal at the interface from the transmitting device comprises receiving the digital signal from a bi-directional communication link; and wherein transmitting the isolated digital signal to the receiving device comprises transmitting the isolated digital signal over a bi-directional communication link.

7. An interface component for communicating and electrically isolating a digital signal between two devices, the interface component comprising:
   bidirectional communication ports for transmitting and receiving the digital signal between the two devices;
   direction control logic for receiving the digital signal from the bidirectional communication ports, for analyzing the digital signal to detect a change in an edge of the digital signal from a high state to low state by monitoring the edge of the digital signal, for determining an intended direction of the digital signal upon detecting a change in the edge of the digital signal from a high state to low state, and for transmitting the digital signal in the intended direction of the digital signal; and unidirectional isolator channels for isolating the digital signal upon determination of the direction of the digital signal, wherein each unidirectional isolator channel is configured to isolate the digital signal in one direction, wherein a unidirectional isolator channel configured to isolate the digital signal in the intended direction of the digital signal is configured to receive the digital signal from the direction control logic, isolate the digital signal, and transmit the isolated digital signal in the intended direction to the bidirectional communication ports.

8. The interface component of claim 7, wherein the direction control logic comprises:

edge detection logic for detecting the edge change in the digital signal;

input logic for determining a first edge change; and a direction state register for holding the determined direction during a transmission of the digital signal.

9. The interface component of claim 7, further comprising:

transmit disable gates for preventing transmission of a second digital signal from a receiving side to a transmitting side.

10. The interface component of claim 7, wherein a first of the two devices is a microprocessor and a second of the two devices is a peripheral chip.

11. The interface component of claim 7, wherein each of the two devices is a peripheral chip.

12. The interface component of claim 7, wherein the isolated digital signal is transmitted to a receiving device through a bidirectional communication port connected to the receiving device.

13. One or more integrated circuit device having a process embodied in said integrated circuit device, said process performing a method of communicating a digital signal across an interface, wherein the interface is positioned between two devices, a transmitting device and a receiving device, and wherein the interface operates to receive, isolate, and transmit bidirectional digital signal between each of the two devices the method comprising:

monitoring a digital signal received at the interface from a transmitting device;

analyzing the digital signal at the interface to detect a change in an edge of the digital signal from a high state to low state by monitoring the edge of the digital signal;

upon detecting a change in the edge of the digital signal from a high state to low state, determining, at the interface, an intended direction of the digital signal;

transmitting the digital signal from the interface to an isolator channel configured to isolate the digital signal in the intended direction of the digital signal;

isolating the digital signal at the isolator channel; and transmitting the isolated digital signal to a receiving device in the intended direction of the digital signal from the isolator channel.

14. The one or more integrated circuit device of claim 13, wherein said process performs the further method of: regulating the isolator channel to prevent transmission of a second digital signal from the transmitting device to the receiving device.

15. The one or more integrated circuit device of claim 13, wherein detecting a change in the edge of the digital signal from a default state comprises detecting a change in the edge of the digital signal from a high state to a low state.

16. The one or more integrated circuit device of claim 13, wherein said process performs the further method of:

determining the receiving device based upon the determined transmission direction of the digital signal.

* * * * *